Figure 1:
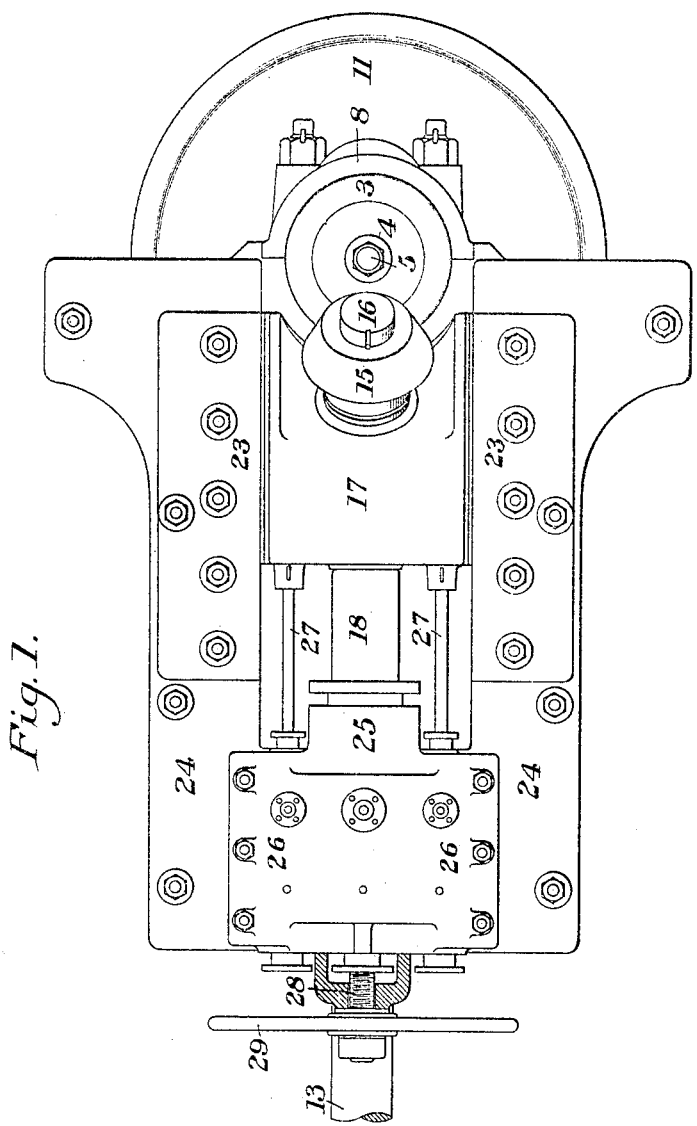

J. KENNEDY.
BEAKING MILL.
APPLICATION FILED DEC. 11, 1906.

920,067.

Patented Apr. 27, 1909.
3 SHEETS—SHEET 1.

WITNESSES
R A Balderson
W. W. Swartz

INVENTOR
Julian Kennedy
by Bakewell & Byrnes
his attys

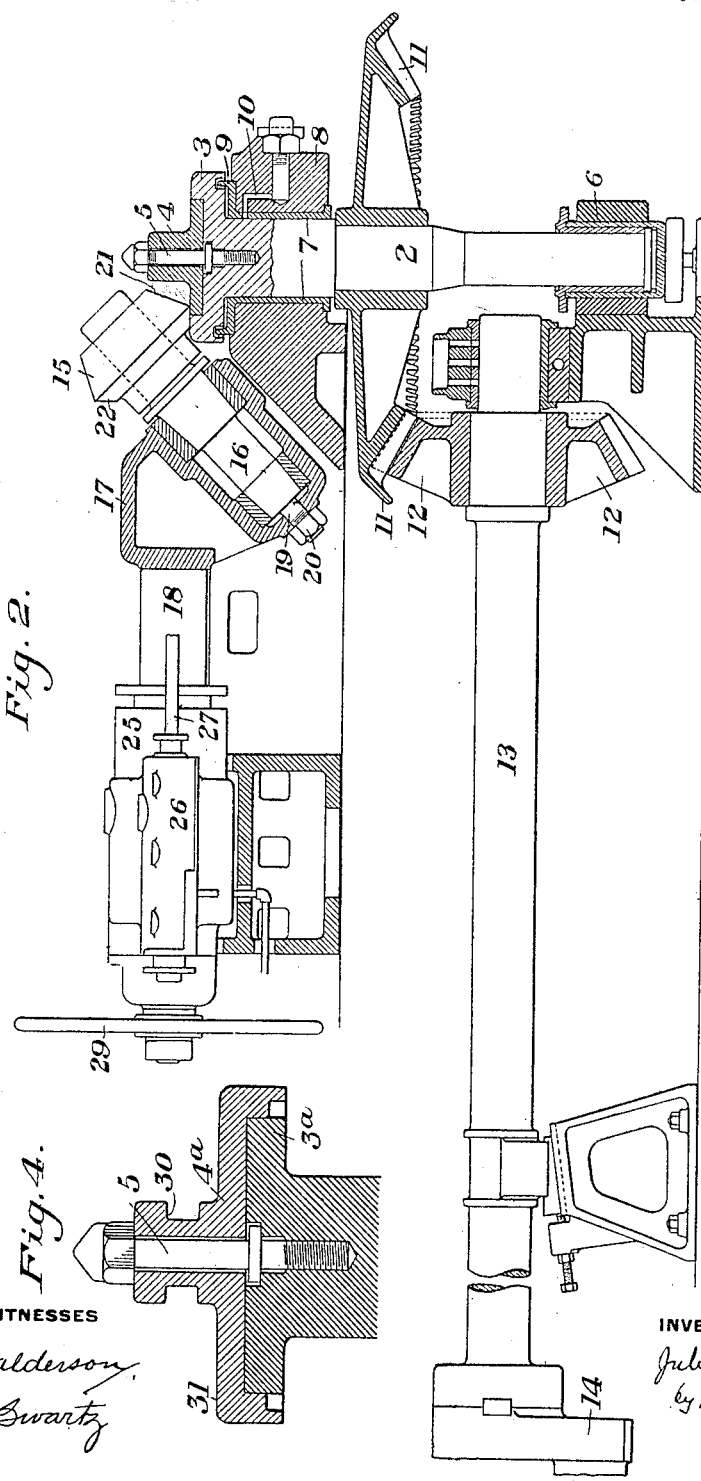

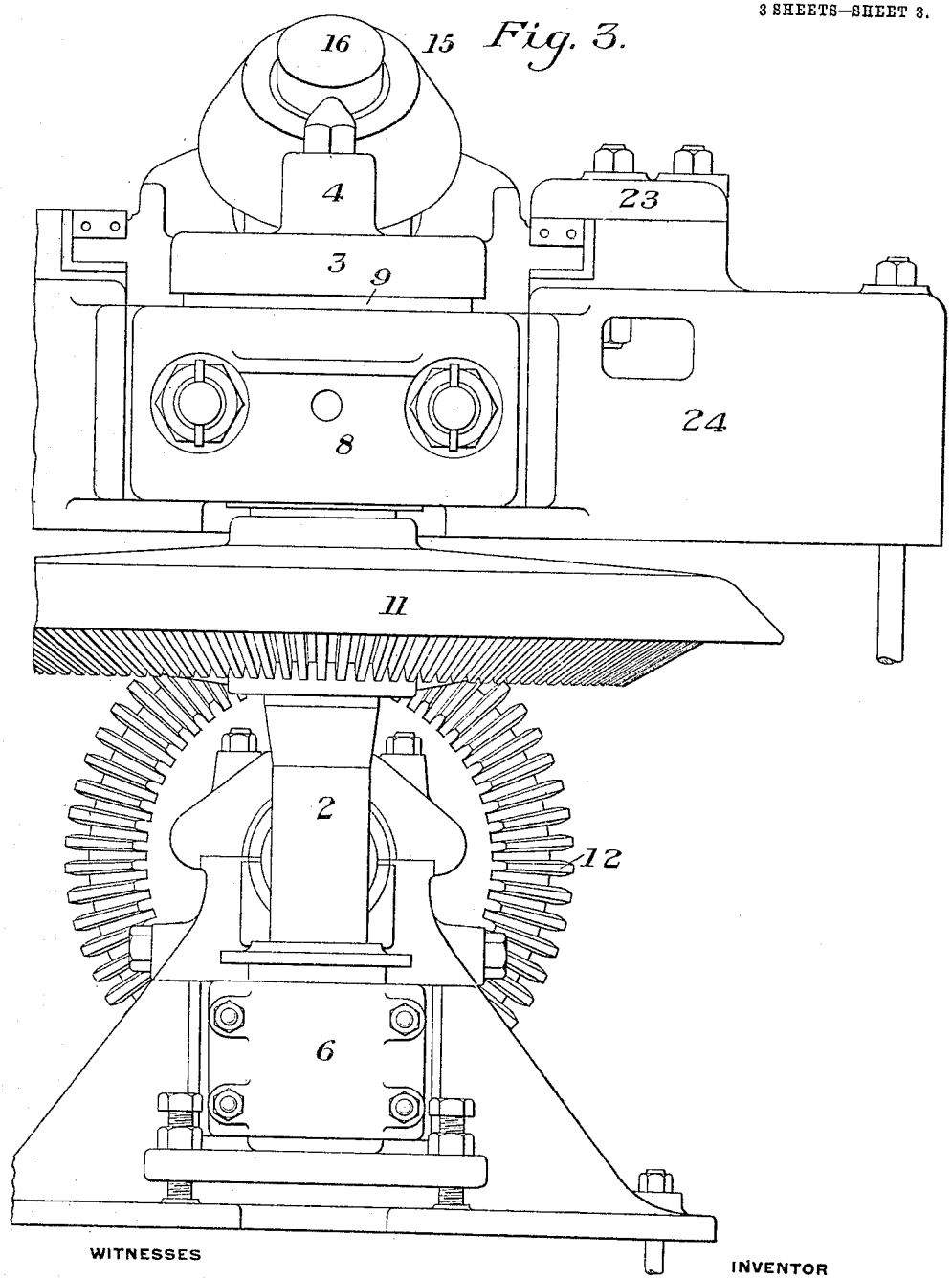

UNITED STATES PATENT OFFICE.

JULIAN KENNEDY, OF PITTSBURG, PENNSYLVANIA.

BEAKING-MILL.

No. 920,067. Specification of Letters Patent. Patented April 27, 1909.

Application filed December 11, 1906. Serial No. 347,291.

*To all whom it may concern:*

Be it known that I, JULIAN KENNEDY, of Pittsburg, Allegheny county, Pennsylvania, have invented a new and useful Improvement in Beaking-Mills, of which the following is a full, clear, and exact description, reference being had to the accompanying drawings, forming part of this specification, in which—

Figure 1 is a top plan view of a mill constructed in accordance with my invention; Fig. 2 is a sectional side elevation of the same; Fig. 3 is a partial front elevation on a larger scale and Fig. 4 is a detail view showing a modified form of a beaking mandrel.

My invention relates to the class of beaking mills wherein steel tires or similar annular bodies are rolled and shaped.

The object of the invention is to provide an efficient machine of this character in which tires may be beaked rapidly and efficiently.

In the drawings, 2 represents a vertical shaft which is enlarged at its top into a horizontal disk 3. To this disk 3 a beaking mandrel 4 is detachably secured by a central screw-bolt 5. The disk 3 is preferably provided with a circular recess in its top into which the lower flanged portion of the beaking mandrel sets.

I have shown the shaft 2 as supported in a bearing 6 at its lower end and extending through a removable bushing 7 in the housing 8. In order to prevent dirt and scale from dropping down into the bearing or bushing I preferably extend or provide a bushing with an outward flange at its top from which extends a vertical lip 9 into an annular recess in the disk 3. I also preferably provide for oiling the bearing through an oil hole 10 in the removable half of the bearing, the hole leading through the removable bushing or brass.

The shaft of the beaking mandrel may be revolved by any suitable connections, and I have shown a large beveled wheel 11 secured to shaft 2 and intermeshing with the pinion 12 on the horizontal shaft 13, driven through crank 14 or by any other suitable connections.

The beaking roller 15 is loosely mounted upon a stem 16 supported in suitable bearings in the head 17, carried upon the end of plunger 18. The head 17 is preferably formed of a steel casting and the shaft 16 may be drawn to place against tapered seats in the head by the threaded extension 19 and nut 20. The roller 15 is provided with a beaking face 21 and also with a friction driving face 22 extending at such an angle as to fit upon the upper horizontal face of the disk 3.

The head 17 moves within suitable side guides 23 secured to the side frames 24 of the machine; and the plunger 18 moves within a single acting hydraulic cylinder 25 supported in the rear upper part of the frame. At the sides of the cylinder 25 are similar hydraulic pull-back cylinders 26 which are single-acting and are connected with the head 17 by piston rods 27.

A stem 28 extends from the rear end of the plunger 18 back through the head to the main cylinder 25 and is screw-threaded in its rear portion to receive a nut and hand wheel 29. The forward movement of the plunger 18 is limited by this nut or stop striking the fixed stop at the rear of the plunger cylinder, thus limiting the movement of the beaking roller toward the axis of the beaking mandrel.

In using the apparatus, the head 17 is retracted and the blank is dropped in place over the beaking mandrel. Fluid is then admitted through a suitable valve to the main cylinder 25 and the head 17 is forced forwardly while the beaking mandrel is positively rotated through its lower driving connections. The beveled face 21 of the beaking roller will then act to shape the tire blank and will be rotated by its frictional contact with the disk 3. Owing to the bevel or angle of the face 21 relative to the axis of the beaking mandrel, the pressure of the roller against the higher blank will cause the roller to be forced downwardly and pressed against the driving disk 3. I prefer to thus drive the beaking roller 15; since if it is driven solely by frictional contact with the tire blank it will not be continuously rotated as efficiently as by this pressure contact with the driving disk. Pressure is maintained upon the cylinder 25 during the beaking action and until the stop prevents any further movement of the beaking roller toward the mandrel. The valve for cylinder 25 is then shifted to exhaust and pressure is admitted to the cylinder 26 which draws back the head and beaking roller. The tire blank may then be removed and a new one inserted and the operation repeated.

Different shapes may be imparted to the tire blank by varying the shape of the mandrel and the beaking roller. Thus in Fig. 4 I show a beaking mandrel 4ª which is provided with an annular recess 30. This recess will form an inwardly projecting rib or web portion upon the tire blank, such rib being properly formed for attachment to the wheel body or web. In this figure I also show the mandrel as extended outwardly and downwardly to form a removable driving plate secured to the driving disk 3ª, this extension being marked 31. As there is considerable wear in the friction upon the mandrel and disk, I can remove this mandrel with the friction face when worn, and replace them while retaining the disk 3ª.

The advantages of my invention result from the simplicity and efficiency of the apparatus and the rapidity of the beaking operation. By driving the beaking roller frictionally, its movement toward the axis of the beaking mandrel does not interfere with its driving, and proper shaping action is obtained. By the angular position of this beaking mandrel, the pressure applied through it to the blank will have a vertical component pressing the roller against its driving disk, thus insuring proper continuous driving of the roller and proper shaping of the blank throughout its circumference. By adjusting the stop for the main plunger, I can easily adjust the machine for different thicknesses or shapes of tire blanks.

An important advantage of my roller beaking mill is that it produces tire blanks or blooms of substantially uniform cross-sectional area throughout. The punched blank is usually thicker on one side than another, and in hand beaking, the product was also un-uniform. My roller beaking mill not only greatly decreases the time required in beaking, but produces a bloom which is uniform, and reduces the amount of work in the succeeding roller mill or mills. It also does away with the use of skilled labor in beaking.

Instead of driving the roller 15 by frictional contact with the mandrel or mandrel disk, such roller 15 may be frictionally mounted upon a driven shaft. In this case, the shaft of roller 15 would tend to rotate it, and this combined with the tendency to turn the blank would probably result in the continuous rotation of the blank and beaking roller.

Many other variations may be made in the form and arrangement of the roller, the mandrel, the driving connections and other parts, without departing from my invention.

I claim:—

1. In a beaking mill, a mandrel arranged to receive the blank around it, connections for positively rotating said mandrel, and a beaking roller arranged to frictionally contact with and be driven by the mandrel itself during the beaking operation while it acts upon the outside of the blank, substantially as described.

2. In a beaking mill, a beaking mandrel, connections arranged to positively drive the same, and a beaking roller arranged to contact with a part of the mandrel and be frictionally driven thereby during the beaking operation; substantially as described.

3. In a beaking mill, a mandrel having a disk, connections arranged to positively drive the disk and mandrel, and a beaking roller arranged to frictionally contact with the disk and be driven thereby during the beaking operation; substantially as described.

4. In a beaking mill, a shaft having a disk, a beaking mandrel removably secured to the shaft above the disk, connections for positively rotating the shaft and mandrel, and a beaking roller arranged to contact frictionally with the disk and be driven thereby during the beaking operation; substantially as described 5. In a beaking mill, a shaft having a disk with a top recess, a beaking mandrel removably secured in the recess, and a beaking roller arranged to contact frictionally with the disk and be driven thereby during the beaking operation; substantially as described.

6. In a beaking mill, a vertically extending shaft, a mandrel thereon, connections for positively rotating the mandrel and shaft, and a movable head carrying a beaking roller arranged to bear frictionally upon an element on the beaking shaft during the beaking operation; substantially as described.

7. In a beaking mill, a shaft having a beaking mandrel, connections arranged to positively drive the shaft and a reciprocating head having a beaking roller mounted therein, said roller being arranged to contact with an element on the beaking shaft and be frictionally driven thereby during the beaking operation; substantially as described.

8. In a beaking mill, a beaking mandrel, connections arranged to positively rotate the same, a reciprocating head carrying a beaking roller having its axis at an angle to the axis of the beaking mandrel said beaking roller being arranged to bear frictionally upon and be driven by the mandrel during the beaking operation, a motive cylinder arranged to force the head toward the beaking mandrel and a stop arranged to limit the forward movement; substantially as described.

9. In a beaking mill, a rotary carrier, a support having a mandrel, means arranged to positively rotate the carrier, a beaking roller, and means for forcing the beaking roller toward the mandrel, the roller being arranged to be pressed against the mandrel carrier by the pressure upon the metal being beaked; substantially as described.

10. In a beaking mill, a rotary support having a beaking mandrel and a beaking roller having its working face at an angle to the axis of the beaking mandrel and another face arranged to be forced against the carrier by pressure of the roller against the metal being beaked; substantially as described.

11. In a beaking mill, a disk-like carrier having a removable face portion, a beaking mandrel above the disk and a beaking roller arranged to contact with the removable plate portion of the disk and be frictionally driven thereby during the beaking operation; substantially as described.

12. In a beaking mill, a rotary mandrel and a presser roll contacting therewith and arranged to rotate at varying speeds corresponding to the changing peripheral speed of the blank; substantially as described.

13. In a beaking mill, a rotary shaft having a beaking mandrel, and a shaft having a beaking roller, said shaft extending at an angle to the mandrel shaft and having one face arranged to bear upon the metal being beaked, and another face arranged to bear upon an element on the mandrel shaft, the beaking roller being arranged to be forced into frictional contact with the beaking shaft in proportion to the pressure exerted on the metal; substantially as described.

14. In a beaking mill, a rotary shaft having a beaking mandrel and a frictional driving face extending at an angle thereto, a shaft having a beaking roller, said shaft extending at an angle to the mandrel shaft and having one face arranged to bear upon the metal and another face extending at an angle thereto and arranged to bear upon the friction face of the mandrel carrier, and mechanism for positively driving the mandrel and carrier, substantially as described.

In testimony whereof, I have hereunto set my hand.

JULIAN KENNEDY.

Witnesses:
   F. McClain,
   A. McB. Rex.